Dec. 3, 1929.   T. L. GATKE   1,738,291
FRICTION LINING AND METHOD OF FORMING SAME
Filed April 13, 1925   2 Sheets-Sheet 1

Inventor
Thomas L. Gatke
By Cromwell, Greist Seely
Attys.

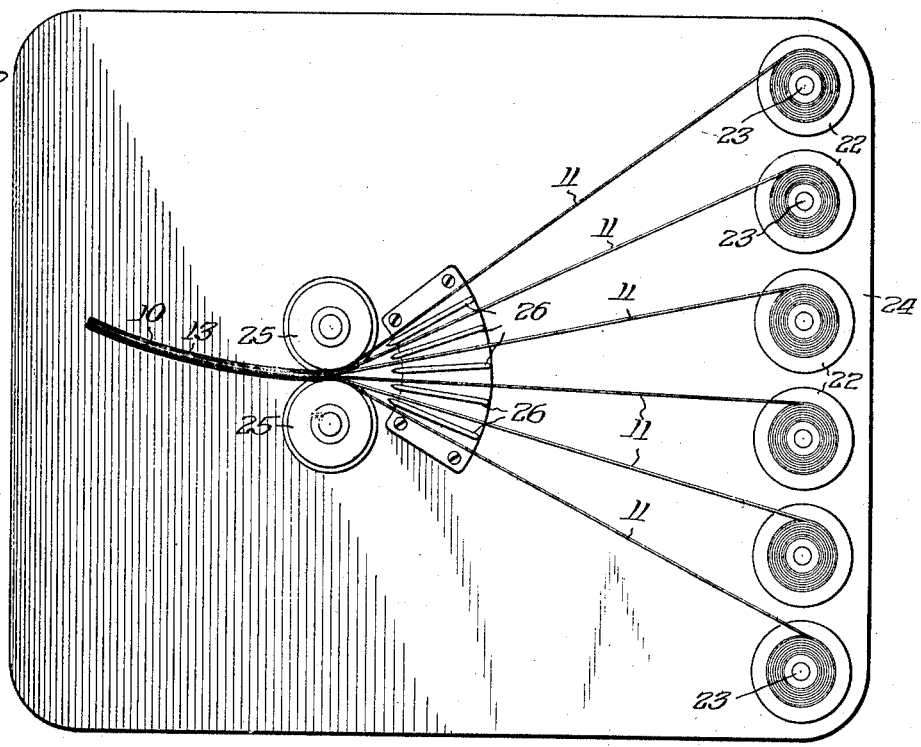
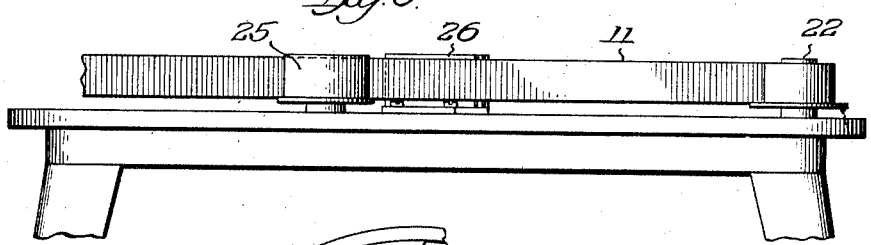
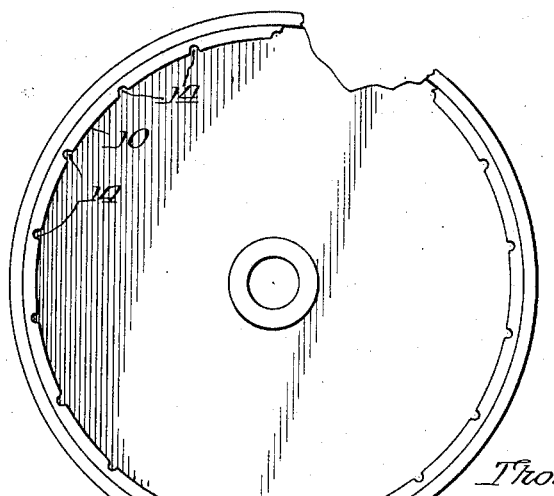

Patented Dec. 3, 1929

1,738,291

UNITED STATES PATENT OFFICE

THOMAS L. GATKE, OF CHICAGO, ILLINOIS

FRICTION LINING AND METHOD OF FORMING SAME

Application filed April 13, 1925. Serial No. 22,728.

This invention relates to friction linings such as are applicable to brakes, clutches and the like.

The principal object of the invention is to provide a strip of friction lining of laminated construction which may be readily curved to conform with the backing element with which associated, and will not disintegrate as a result of constant flexure with the backing element.

Another object is to provide a laminated strip of lining having transverse grooves in its friction face serving to keep the face free of foreign matter, aid in cooling, eliminate squeaking, prevent loosening of the outermost laminations, and insure uniform engagement without gripping throughout the length of the strip.

Still another object is to provide a method of forming a laminated strip of lining, by means of which the resulting arrangement and stresses of the constituent materials of the strip are particularly suited for the service to which the strip is subjected in association with a constantly flexing backing element.

Other objects and advantages of the invention will become evident upon a full understanding of the characteristics of the strip of friction lining and the method of forming the same.

In order that the invention may be readily understood, one structural embodiment of the strip of friction lining and two possible methods for producing the same are hereinafter disclosed, but such disclosures are presented merely for the purpose of exemplification and are not intended to restrict the spirit of the invention short of its comprehensive scope as defined in the appended claims.

In the drawings:

Fig. 7 is a schematic illustration of an apparatus for producing the strip by another method;

Fig. 8 is another schematic view of the same apparatus; and

Fig. 9 is a view which shows the strip of friction lining as applied to the conventional vehicle brake band.

Figure 1:
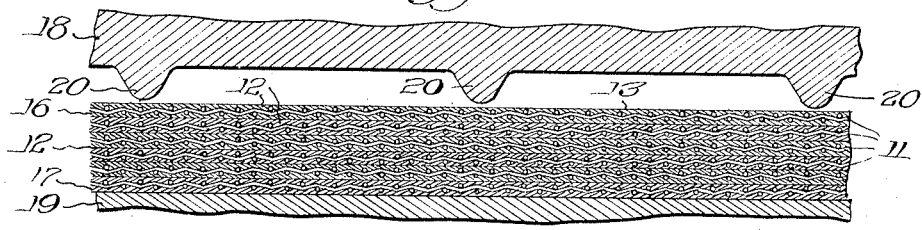
Figs. 1, 2 and 3 are sectional views showing the strip of friction lining in progressive stages of formation in suitable moulding dies.
Figure 2:
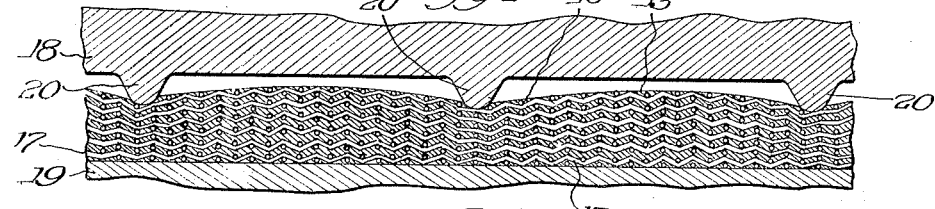
Figure 3:
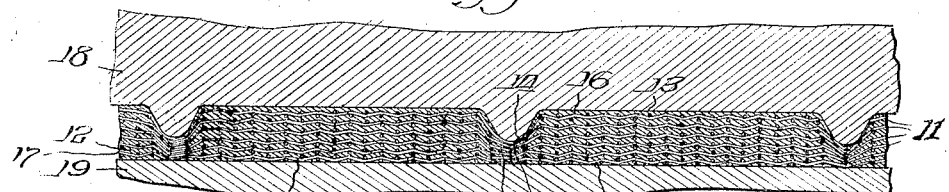
Figure 4:
Fig. 4 is a side view of the finished strip of lining.

The friction lining of the invention is a laminated strip 10 which is composed of a plurality of superposed layers 11 of asbestos fabric or other material suitable for use in such capacity. The layers 11 are enveloped in a cementitious material 12 which holds the layers together in fixed relation. The friction face 13 of the strip is provided at intervals longitudinally thereof with transverse grooves or depressions 14 which are formed by correspondingly shaped depressions 15 in those layers 11 nearest to the friction face of the strip. Most of the material 12 which would occupy the space between the layers 11 at the depressions, were the depressions omitted, is forced from between the depressions to positions between the flat portions of the layers. The depressions 15 in the layer 16 nearest the friction face 13 of the strip are deeper than the depressions in the layers more removed from the friction face, and this is true of each of the other layers in turn, the layer 17 nearest the opposite face of the strip being substantially flat and unaffected by the formation of the depressions.

The strip 10 of friction lining may be formed by one method between two flat die members 18 and 19. The layers 11 are spread out flatly upon the bottom member 19 with the cementitious material 12 enveloping the layers and filling the spaces therebetween, and the upper member 18 is then brought down upon the layers to mould the same between the members into a strip of the desired formation. The upper member 18 is provided with a plurality of transversely extending ribs 20 for producing the grooves 14 in the finished strip. When the ribs 20 come into contact with the upper face of the yet unmoulded strip, they commence to depress the layers directly below the ribs, and this action forces the material 12 away from under the ribs 20 and into the spaces between the layers at points removed from the ribs, thus tending to spread the layers apart at those points. Such a redistribution of the cementitious material 12 serves to localize most of the material between the depressions 14 in the strip, which is very desirable as the flat portions of the strip between the depressions obviously receive all of the wear in service. When the upper die member 18 is fully lowered, the strip of friction lining assumes its finished shape, and is cured in such form while held under pressure between the members, the curing being effected by any of the well known pressure and heat methods.

In the finished strip the layers 11 nearest the grooved friction face 13 of the strip are set under tension as a result of the formation therein of the depressions, and this results in a tendency of the strip to bow slightly in the direction of the friction face 13. The progressively increasing tension in the layers 11 approaching the friction face 13 aids materially in preventing the layers from blistering and separating from each other under longitudinally compressing stresses on the layers nearest the surface 13 when the strip is bent in that direction to conform with the curvature of a backing element, and the grooves 14 in the friction face 13 provide spaces in which the compressive stresses in the layers 11 nearest the friction face set up by curvature of the strip may be relieved without buckling and resulting disintegration.

Figure 5:
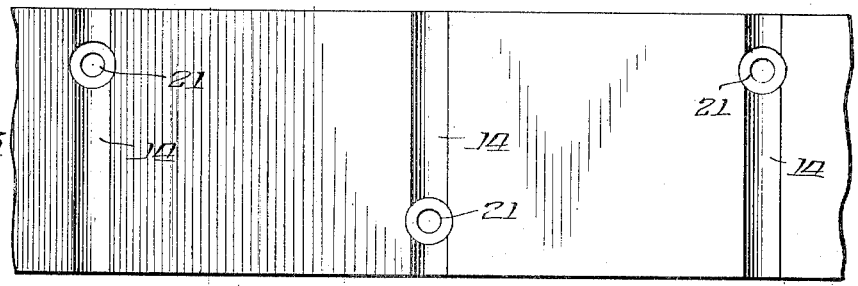
Fig. 5 is a front view of the strip.
Figure 6:
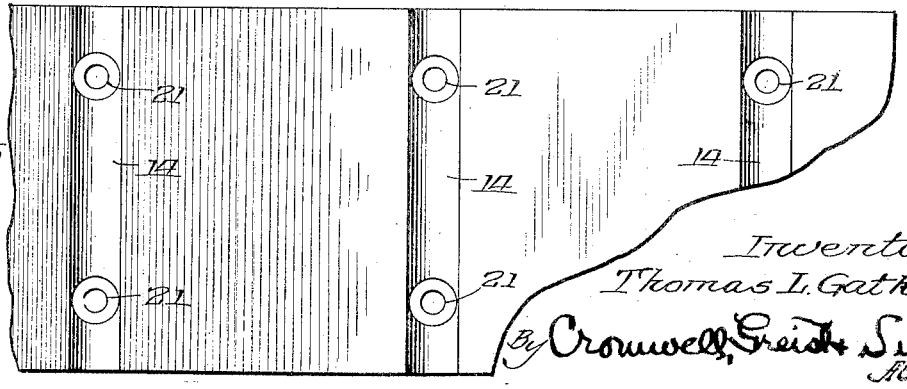
Fig. 6 is a front view of a wider strip.

The strip 10 of friction lining may be attached to the backing element by passing the usual rivets through countersunk apertures 21 in the strip at the grooves 14. The apertures 21 may be moulded in the strip by suitable studs on the under face of the upper die members 19 at the same time that the strip is being moulded. For narrow strips, such as illustrated in Fig. 5, the apertures may be staggered in consecutive grooves, and for wider strips, such as shown in Fig. 6, the apertures may be arranged in pairs in each groove. The positioning of the apertures in the grooves advantageously removes the heads of the rivets from the plane of wear, but does not weaken the connection between the strip and the backing element because the rivets still embrace all of the layers 11 in the strip.

One of the layers 11 near the back face of the strip 10 may advantageously be of metal fabric as distinguished from asbestos fabric, whereby to provide a strong reinforcement in the strip for resisting tensile stresses, and, when such a layer is employed, the same will interlock with the rivets to prevent loosening of the rivets in the strip in the event of softening of the same under excessively hard service.

In certain cases it may be desirable to provide the rivet apertures in the friction face of the strip. This may be accomplished to suit any requirement by properly positioning the studs on the die member 19.

Aside from the saving effected because of the elimination of the added steps of finishing and fitting there are marked advantages in moulding the rivet apertures which are not attainable by punching or drilling them through the finished strip. When moulded, the wall of the aperture presents an unbroken, and therefore a more durable, bearing for the stem and head of the rivet. Moreover, it is possible to attain accuracy in forming and positioning the apertures, insuring preciseness in assembling and efficiency in service.

The action of the die members 19 and 20 on the cementitious material 12 in the strip, tending first to force the material longitudinally from the locations of the grooves 14 to points between such locations, and then vertically again under pressure into the body of the strip, serves to impregnate the layers 11 with the material 12 more thoroughly than would otherwise be possible, and this adds materially to the wearing quality of the strip.

An increased tension in the layer or layers 11 nearest the friction face 13 of the strip may be obtained by another method without grooving the strip in the manner previously described. In this second method the layers 11 are separately coated with cementitious material 12 and are carried in rolled form on spools 22 which are rotatably mounted on parallel spindles 23 carried by a suitable frame 24. The layers 11 are led from their spools 22 in converging relation to a meeting point between two co-acting pressure rollers 25 also mounted on the frame 24. The rollers 25, which are driven from some suitable source, act to press the layers together and set them in the strip under the relative tensions applied to the layers by suitable braking devices operating upon the spools. The resulting strip 10 which leaves the rollers 25 has the layers 11 therein associated under different tensions, with the layer nearest the friction surface 13 preferably under the greatest tension, whereby flexing of the strip will not tend to buckle such layer when the strip is applied to a curved backing element. The curing of the strip may then be administered between the usual press platens. The layers 11 are prevented from coming into engagement with each other and sticking in such engagement prior to their entry between the rollers 25 by means of a plurality of thin plates 26 which extend between the converging layers 11 up to points just short of the opening between the rollers 25. It will be appreciated, that by this method the layers in the strip may be combined together under different relative tensions through corresponding tensioning of the spools 22 without depressing the layers nearest the surface 13 by the formation of the grooves.

The strips of friction lining, when formed by either of the two methods described, may advantageously be produced first in the form of large sheets, which may then be cut into the desired sizes of strips in any suitable cutting machine.

The strips may also be formed by providing the transverse grooves in the course of moulding that type of lining in which a fabric is refolded upon itself to form a strip of the desired dimensions, and the invention may be utilized to advantage in linings formed by other well known processes.

In Fig. 9 is shown an ordinary brake band to which a strip of the friction lining has been applied.

I claim:

1. An elongated strip of friction lining for association with a curved backing element, comprising superposed layers of fabric, and a cementitious material enveloping the layers and securing the same together with the layer nearest the friction face of the strip under greater tension than the layer nearest the opposite face of the strip.

2. An elongated strip of friction lining for association with a curved backing element, comprising superposed layers of fabric, each of which layers extends without interruption throughout the length of the strip, and a cementitious material enveloping the layers and securing the same together, the strip having transverse depressions in the friction face thereof.

3. An elongated strip of friction lining for association with a curved backing element, comprising superposed layers of fabric, and a cementitious material enveloping the layers and securing the same together, the strip having transverse depressions in the friction face thereof and the layers nearest such face having similar depressions.

4. An elongated strip of friction lining for association with a curved backing element, comprising superposed layers of fabric, and a cementitious material enveloping the layers and securing the same together, the strip having transverse depressions in the friction face thereof and the layers nearest such face having similar depressions from which the cementitious material is displaced into those portions of the strip intermediate the depressions.

5. An elongated flexible strip of friction lining for association with a flexible curved backing element, characterized by a series of integrally connected friction blocks composed of superposed layers of fabric enveloped in and held together by a cementitious friction material, all of the layers in the blocks extending without interruption from one block into the next.

6. A flexible elongated strip of friction lining of moulded one-piece construction for association with a flexible curved backing element, characterized by a series of integrally connected friction blocks composed of superposed layers of fabric enveloped in and held together by a mouldable friction material, all of the layers in the blocks extending without interruption from one block into the next.

7. A flexible elongated strip of friction lining for association with a flexible curved backing element, characterized by a series of relatively thick friction blocks composed of superposed layers of fabric enveloped in and held together by a cementitious material, the blocks being integrally connected at their ends by relatively thin webs composed of all the layers in the blocks held together in a more compressed form.

8. A flexible elongated strip of friction lining for association with a flexible curved backing element, characterized by a series of relatively thick friction blocks composed of superposed layers of asbestos fabric enveloped in and held together by a relatively large amount of a mouldable friction material, the blocks being integrally connected at their ends by relatively thin webs composed of all of the layers in the blocks held together in a more compressed form by a relatively small amount of the friction material.

9. A method of forming friction linings for application to curved backing elements, which consists in moulding superposed layers of fabric impregnated with a mouldable friction material, in such a way that the layer nearest the friction face of the lining is placed under greater tension than the layer nearest the opposite face of the lining.

10. A method of forming grooved friction linings of laminated fabric construction for application to curved backing elements, which consists in perpendicularly depressing the friction face of the lining at intervals to cause corresponding depressions of the layers nearest the friction face, whereby to form the grooves without interrupting the continuity of the layers.

11. A method of forming friction linings, which consists in moulding under pressure superposed layers of fabric impregnated with a mouldable friction material, the pressure being so applied that the friction material is first forced longitudinally and then perpendicularly with relation to the layers, whereby to effect a thorough impregnation of the layers with the material.

12. An elongated strip of brake lining for application to the concave face of a curved brake band, comprising a row of relatively thick friction blocks composed of superposed layers of fabric involved in and held together by a cementitious material, the blocks being integrally connected together at their ends by relatively thin webs composed of all of the layers in the blocks held together in a more compressed form, and the layers in the webs nearest the friction face of the blocks being indented whereby to curve the row of blocks.

In testimony whereof I have hereunto subscribed my name.

THOMAS L. GATKE.